(12) United States Patent
Sullivan et al.

(10) Patent No.: US 8,778,520 B2
(45) Date of Patent: Jul. 15, 2014

(54) LIQUID ELECTROLYTE BATTERY WITH MIXING DEVICE

(75) Inventors: Charles Robert Sullivan, Schwerte (DE); Steffen Tschirch, Zschopau (DE)

(73) Assignee: IQ Power Licensing AG, Zug (CH)

( * ) Notice: Subject to any disclaimer, the term of this patent is extended or adjusted under 35 U.S.C. 154(b) by 0 days.

(21) Appl. No.: 13/700,609

(22) PCT Filed: May 5, 2011

(86) PCT No.: PCT/DE2011/001030
§ 371 (c)(1),
(2), (4) Date: Feb. 7, 2013

(87) PCT Pub. No.: WO2011/147398
PCT Pub. Date: Dec. 1, 2011

(65) Prior Publication Data
US 2013/0202925 A1 Aug. 8, 2013

(30) Foreign Application Priority Data
May 28, 2010 (DE) .......................... 10 2010 021 868

(51) Int. Cl.
*H01M 2/38* (2006.01)
*H01M 10/12* (2006.01)

(52) U.S. Cl.
USPC ........................................................ 429/81

(58) Field of Classification Search
USPC ................ 429/51, 70, 81, 72, 163, 175–177; 29/623.1
See application file for complete search history.

(56) References Cited

U.S. PATENT DOCUMENTS

| 4,963,444 A | 10/1990 | Delaney |
| 5,032,476 A | 7/1991 | Kirby |
| 5,096,444 A | 3/1992 | Delaney et al. |
| 2002/0028373 A1* | 3/2002 | Tschirch .................... 429/81 |

FOREIGN PATENT DOCUMENTS

| DE | 91 14 909.6 | 2/1992 |
| DE | 297 18 004 U1 | 2/1998 |
| GB | 1 203 325 A | 8/1970 |
| WO | WO 2008/019676 A2 | 2/2008 |
| WO | WO 2011/029035 A2 | 3/2011 |

OTHER PUBLICATIONS

International Search Report issued by the European Patent Office with regard to the corresponding International Patent Application No. PCT/DE2011/001030, Jan. 31, 2012.

* cited by examiner

*Primary Examiner* — Carlos Barcena
*Assistant Examiner* — Lilia V Nedialkova
(74) *Attorney, Agent, or Firm* — Feiereisen LLC

(57) ABSTRACT

The invention relates to a liquid electrolyte battery having a mixing device (5), wherein the liquid electrolyte battery has a battery case (1), an electrode stack (2), an electrolyte having an electrolyte level (3), and a mixing device (5) and the mixing device (5) has the following characteristics: a channel plate (6) arranged vertically in the battery case (1) in the installed state, a drainage plate (7) arranged horizontally in the battery case in the installed state, and a hinge (8) connecting the channel plate (6) to the drainage plate (7), wherein the hinge (8) has a pivot angle that is dimensioned such that an electrode stack (2) can be inserted into the battery case (1) when the drainage plate (7) is pivoted upward.

3 Claims, 4 Drawing Sheets

LIQUID ELECTROLYTE BATTERY WITH MIXING DEVICE

The invention relates to a liquid electrolyte battery, which can preferably be used in motor vehicles or on boats.

The aim, in particular in the automotive industry, for a lightweight construction also relates to reducing the battery weight. However, there is simultaneously a need for higher battery power because, in addition to the energy for starting the vehicle, energy is also needed for additional equipment such as power windows, servomotors for adjustment of the seats or for electric heating of the seats. Furthermore, it is desirable to keep the battery power as much as possible at a constant high level over the battery life.

A number of conventional measures are known for increasing the performance of a conventional lead-acid battery. The term performance in this context relates the ability of the battery to supply current and to receive current.

Making the fullest possible use of electrode surface represents a particular problem with lead-acid batteries. When the acid concentration is too high in an area of the electrode surface, corrosion occurs which ultimately causes the electrode plates to disintegrate. When the acid concentration is too low, the electrolytic properties for a reliable operation of battery are inadequate. Due to various effects within a battery known in the art, the acid density is nonuniform. To overcome this shortcoming, devices for intermixing of the electrolyte have been developed. This also prevents the formation of deposits, which diminish the function and the life of the battery as well.

In the document DE 9114,909 U1 a storage battery is disclosed, wherein electrolyte circulation is forced by introducing gas from a pressurized gas source. This circulation process has only limited use for vehicle batteries due to the complex structure of the circulating device, especially since an additional source of pressurized gas is required.

Prior art electrolyte mixing devices are also known which are referred to as hydrostatic pumps and whose function will be described below:

When a vehicle moves at a constant speed, i.e. when it neither decelerates nor accelerates, the level of the liquid electrolyte in the battery in the vehicle is oriented planar and horizontal. In a deceleration or acceleration operation, the electrolyte sloshes back and forth due to the mass inertia. The resulting electrolyte flows are directed through barriers and channels so that optimum mixing is achieved.

Figure 1:
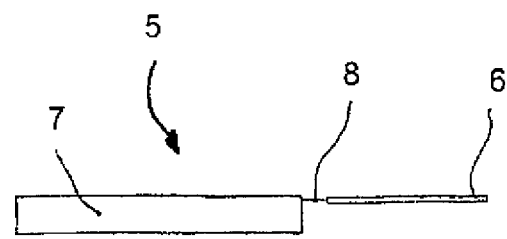
Figure 1:
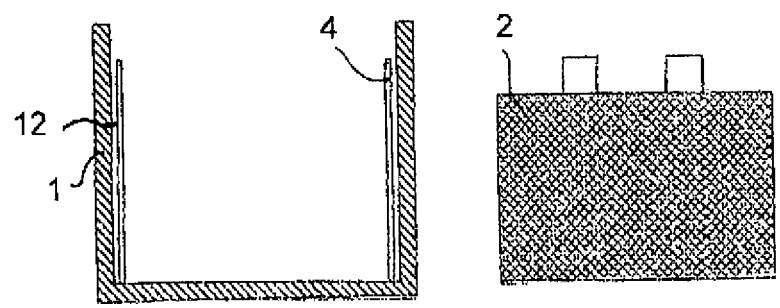

This principle is described, inter alia, in the documents U.S. Pat. Nos. 4,963,444; 5,096,787; 5,032,476 and in German Utility Model 297 18 004.5 which constitutes the closest prior art. The subject matter of the closest prior art is an angular mixing device arranged between the electrodes and the battery case wall, as shown in FIG. 1 of this document.

The degree of mixing is determined by various factors, for example by the consistency of the acid, which is also temperature-dependent, and by an optimal geometry of the mixing device. It has been found that even slight deviations from the optimal geometry cause the efficiency of the mixing device to deteriorate.

Lead-acid batteries are preferably produced semi-automatically, so that errors may occur during the manually-performed assembly steps. When the individual elements are not joined together exactly during the installation of the assembled mixing device, changes in the flow channels occur, which can cause a significant deterioration of the mixing action. Therefore, a complex control process is required for preventing such errors during assembly, since these errors can no longer be detected after the battery is fully assembled and may cause premature failure of the battery after several years.

In the assembly process, the sections of the two-part mixing device that are to be arranged vertically must be inserted first, followed by insertion of the stack with the lead electrodes in the battery housing. Only then can the horizontal section of the mixing device be installed. Preferably, clip fasteners were previously used, which, however, do not always reliably lock in place, thus causing the aforedescribed problems. To avoid these problems, elaborate checks needed to be performed later, before the battery cover is secured to the battery case.

It is therefore the object of the invention to increase the mounting reliability of the mixing device and to provide a mixing device which can also be mounted error-free by less qualified personnel.

This object is attained with a liquid electrolyte battery according to claim 1. The liquid electrolyte battery includes a battery case, an electrode stack, an electrolyte and a mixing device.

The mixing device has the following characteristics: A channel plate which is arranged vertically in the battery case after assembly and which forms a flow channel with the inner surface of the respective side wall, a drainage plate which is arranged horizontally in the battery case after assembly, and a hinge which connects the channel plate with the drainage plate, wherein the hinge has a pivot angle, which is dimensioned so that the electrode stack can be inserted into the battery case when the drainage plate is pivoted upward.

Depending on the installation position of the battery in the vehicle, the electrolyte present in the flow channel is pushed upward during acceleration, deceleration or cornering of the vehicle, flows out of an overflow opening arranged on the upper edge of the channel plate, flows to the drainage plate and along the drainage plate toward the opposite side wall of the battery, and finally returns through an opening in the drainage plate to the battery housing, where the electrolyte intermixes with the electrolyte volume present therein.

According to the invention, the channel plate and the drainage plate are connected via a hinge. The hinge ensures a defined positional relationship between the two plates and hence optimum flow conditions in the battery case after the installation of the mixing device. The hinge allows pivoting of the drainage plate from the horizontal position beyond the vertical line so as to enable an unimpeded insertion of the electrode stack into the battery case from the top. The hinge also allows the drainage plate to be pivoted back into the horizontal position after insertion of the electrode stack into the battery case. The battery case can be closed with a lid after the channel plate has been pushed into the battery case, the drainage plate has been pivoted up, the electrode stack has been inserted and the drainage plate has been pivoted back.

Accordingly, six drainage plates need to be pivoted in a vehicle battery having six cells. This requires fewer and simpler handling steps than connecting the drainage plates with the channel plates with clips, as is in the prior art. The invention has another advantage, which will be explained with reference to the closest prior art:

With the conventional solution, it was necessary to push the channel plates to be inserted into the battery case entirely to the bottom of the battery case or against a projection in the battery case. As mentioned above, predetermined tolerances must be observed in the channels and in the region of the overflow. For example, when the channel plates are too long or too short, or when the projection, on which the channel plates are supported, is not precisely located at the intended geometrical position on the battery case, the top edge of the respective channel plate and the overflow opening arranged thereon will not have the optimal position to ensure a optimal intermixing.

With the inventive solution, the mixing device is automatically brought into the intended optimal position when the drainage plate is pivoted back. The drainage plate and the channel plate are connected with one another via the hinge, i.e., they have a well-defined mutual geometric relationship. In other words, the geometric position of the connection between the drainage plate and the channel plate is essential for the efficiency of intermixing. This geometric position is unchangeable as a result of the hinge, in contrast to clip connections according to the prior art.

According to another feature of the invention, the hinge of the mixing evice has a pivot angle of at least 100 degrees, up to which the drainage plate can be pivoted from the horizontal position. The drainage plate is thus inclined outwardly from the vertical by at least 10 degrees and is thereby securely held in this position by its own weight, i.e. it does not pivot back by itself.

According to another feature of the invention, the hinge of the mixing device has a pivot angle of at least 180 degrees, up to which the drainage plate can be pivoted from the horizontal position. The drainage plate then remains pivoted outwardly by at least 90 degrees from the vertical, so that the electrode stack can be inserted from any side.

According to another feature of the invention, the hinge of the mixing device is a film hinge. The mixing device of this embodiment can then be produced in a single operation, for example by injection molding, which is particularly cost-effective.

The invention will now be described in more detail with reference to schematic drawings.

Figure 2:
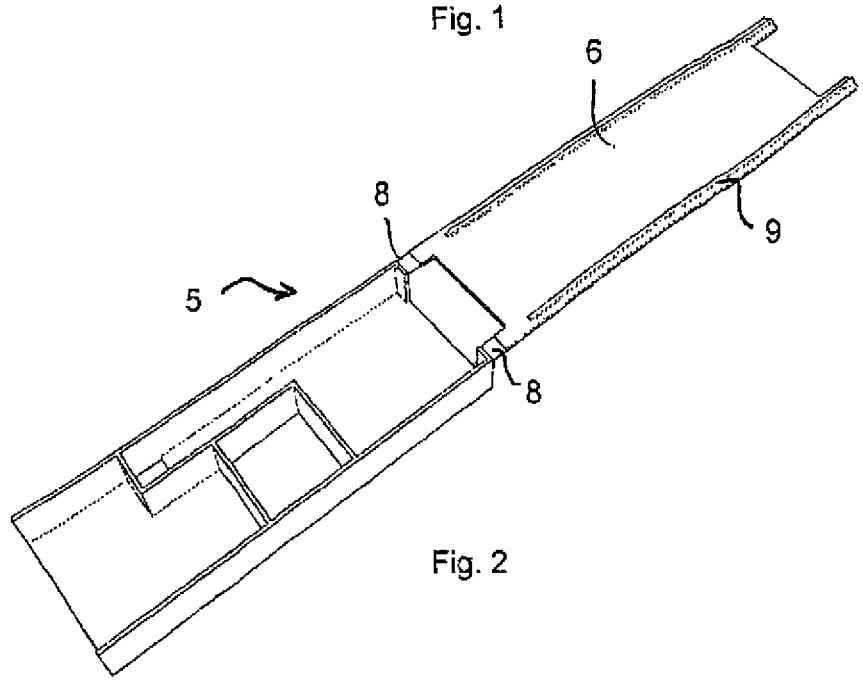
Figure 3:
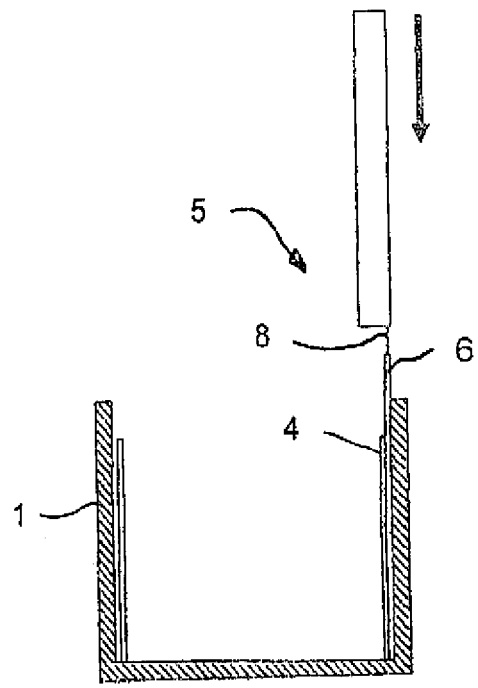
Figure 4:
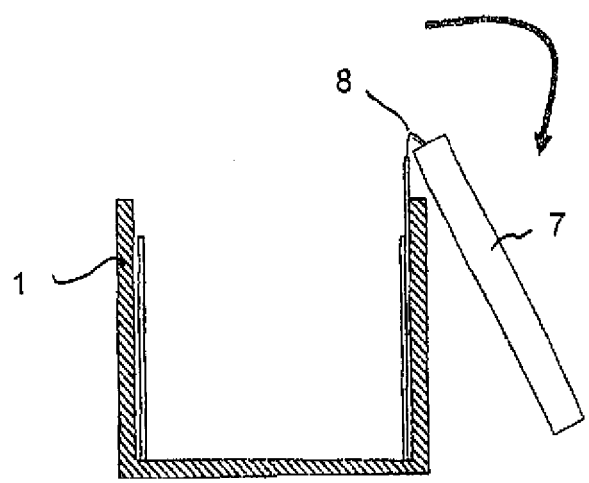
Figure 5:
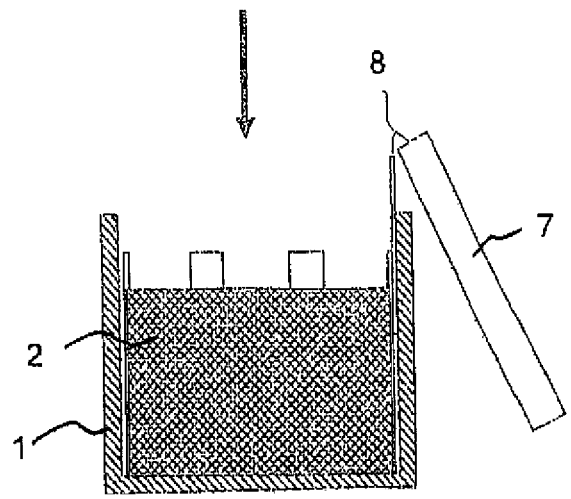
Figure 6:
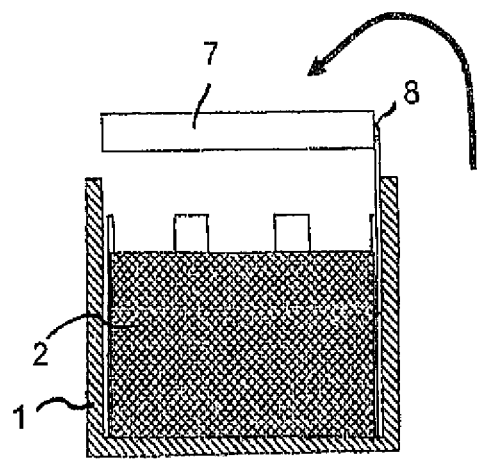
Figure 7:
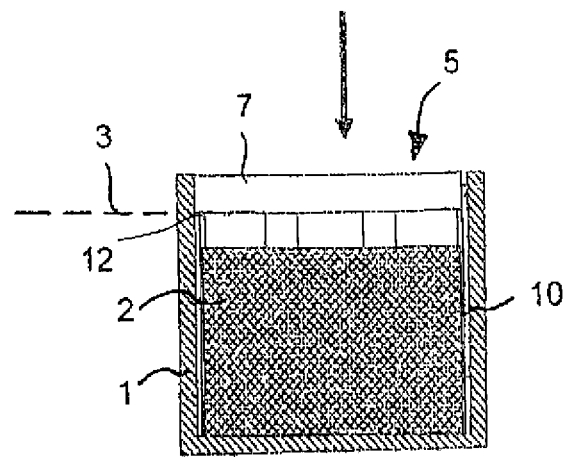
Figure 8:
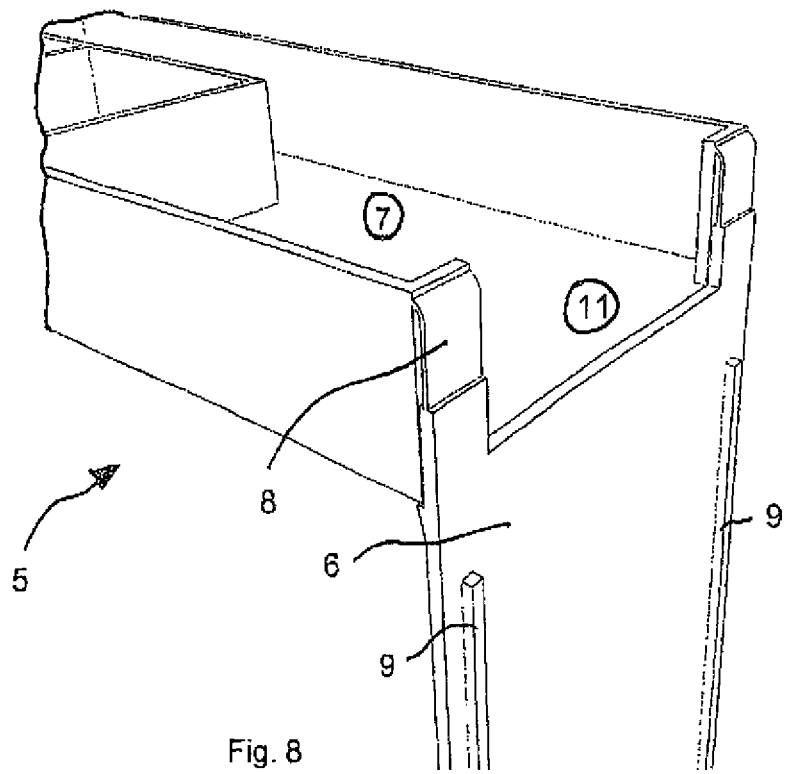

FIG. 1 shows schematically the cross section of a battery case, the side view of an electrode stack, and the side view of the mixing device in the flipped-open state, FIG. 2 shows schematically in a perspective view and on an enlarged scale the mixing device in the flipped-open state, FIG. 3 shows schematically the insertion of the mixing device into the battery case, FIG. 4 shows schematically the channel plate partially inserted into the battery case and the lateral pivoting of the drainage plate of the mixing device, FIG. 5 shows schematically the insertion of the electrode stack into the battery case, FIG. 6 shows schematically pivoting of the drainage plate back into the horizontal position, FIG. 7 shows schematically the fully assembled mixing device, and FIG. 8 shows a detail of the mixing device illustrated in FIG. 2 on an enlarged scale.

FIG. 1 shows the cross section of a battery case 1, the side view of an electrode stack 2, and the side view of a mixing device 5. The mixing device 5 has a channel plate 6 and a drainage plate 7, which are pivotally connected with one another via a film hinge 8. A guide and support rail 4, in which the channel plate 6 is guided parallel to the battery case wall, is arranged in the battery case 1.

FIG. 2 shows the flipped-open mixing apparatus 5 is a perspective view on an enlarged scale.

FIG. 3 shows the insertion of the mixing device 5. To this end, the mixing device 5 is positioned vertically above the battery case and lowered to a predetermined position, wherein the channel plate 6 slides downward in the guide and support rail 4 along the battery case wall.

FIG. 4 shows pivoting of the drainage plate 7 of the mixing device 5 inserted into the battery case via the hinge 8 toward the outside of the battery side wall.

FIG. 5 shows the insertion of an electrode stack 2 into the battery case 1 after the drainage plate 7 has been pivoted.

FIG. 6 shows pivoting back of the drainage plate 7 into the horizontal position following insertion of an electrode stack 2 into the battery case 1

FIG. 7 shows the insertion of the mixing device 5 up to the intended end position on a support 12.

FIG. 8 shows on an enlarged scale in a perspective view a detail of the mixing device 5 shown in FIG. 2. The projections 9 on the channel plate 6 serve to form the flow channel 10 between the channel plate 6 and the corresponding battery case sidewall. The overflow opening 11 formed in the upper portion of the channel plate 6 in form of a recess allows the quantity of electrolyte pressed out of the flow channel 10 to overflow onto the drainage plate 7.

The invention claimed is:

1. Liquid electrolyte battery with a mixing device (5), wherein the liquid electrolyte battery comprises
    a battery case (1),
    an electrode stack (2),
    an electrolyte with an electrolyte level (3) defining a horizontal position in an installed state of the battery, and
    a mixing device (5) and wherein the mixing device (5) has the following features:
    a channel plate (6) arranged vertically in the battery case (1) in the installed state,
    a drainage plate (7) arranged horizontally in the battery case in the installed state, and
    a hinge (8) connecting the channel plate (6) with the drainage plate (7}, wherein
    the hinge (8) has a pivot angle, which is dimensioned so that an electrode stack (2) can be inserted into the battery case (1) when the drainage plate (7) is pivoted upward from the horizontal position with a pivot angle of at least 100 degrees from the horizontal position.

2. Electrolyte battery with mixing device according to claim 1, wherein the pivot angle is at least 180 degrees.

3. Electrolyte battery with mixing device according to claim 1, wherein the hinge (8) of the mixing device (5) is a foil hinge.

* * * * *